R. E. L. MORTON.
CONVERTIBLE SEAT FOR AUTOMOBILES.
APPLICATION FILED JUNE 16, 1913.
1,095,660.
Patented May 5, 1914.
2 SHEETS—SHEET 1.
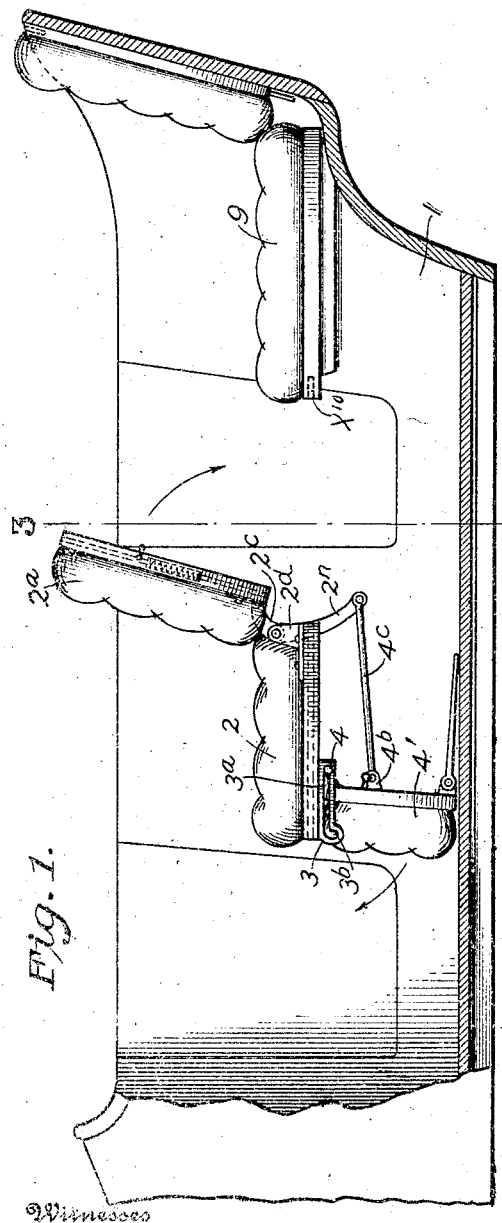
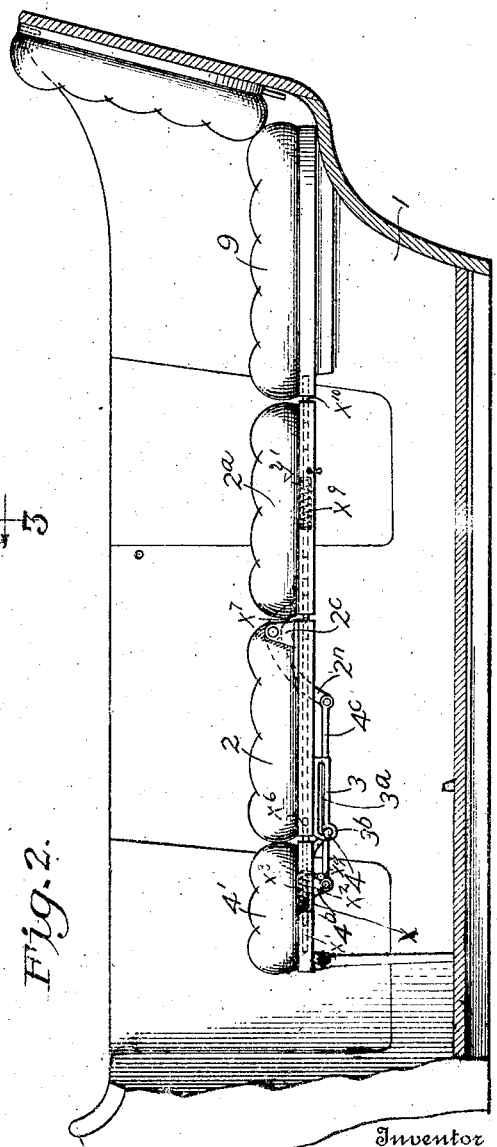

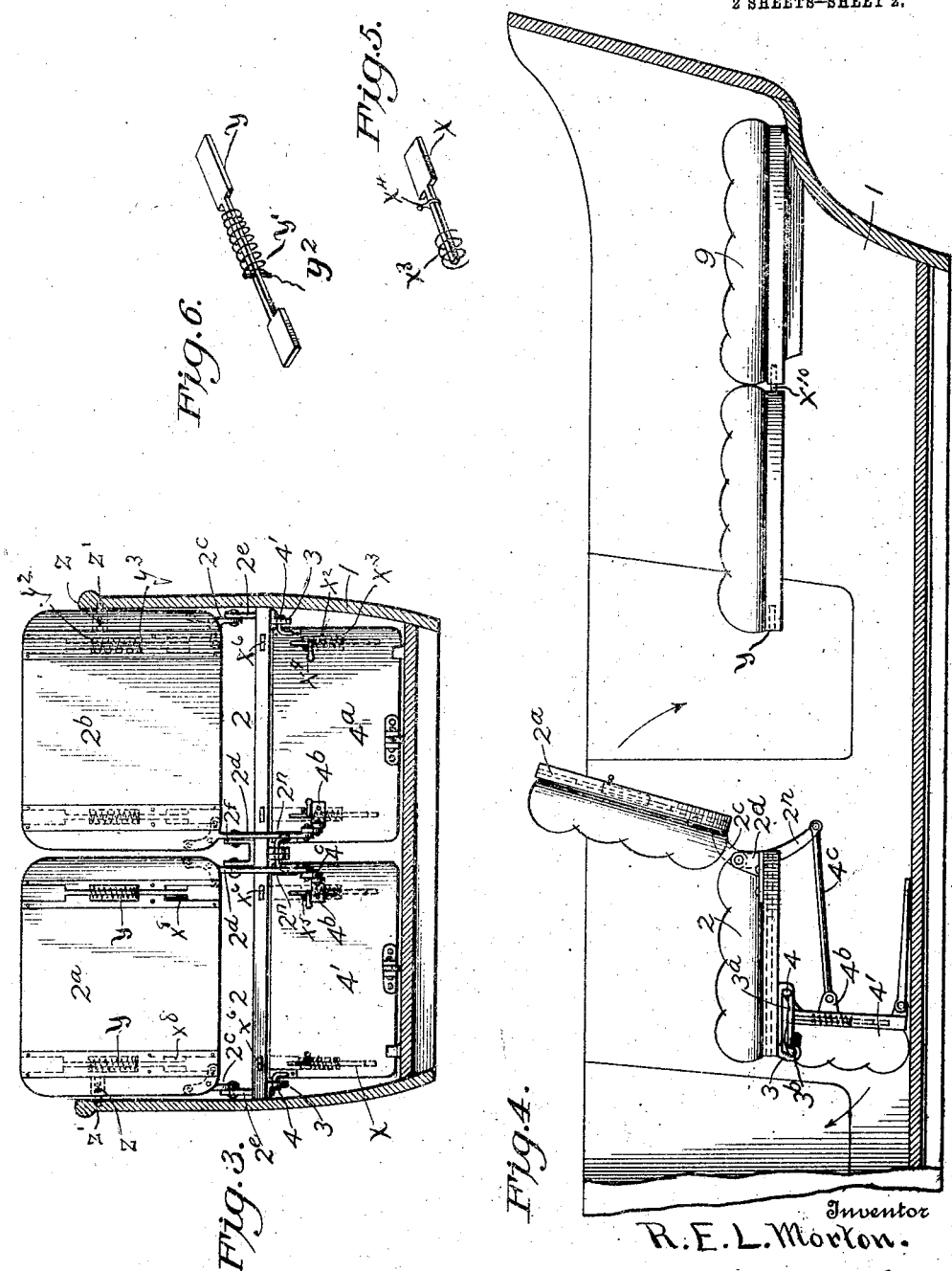

UNITED STATES PATENT OFFICE.

ROBERT E. L. MORTON, OF DINUBA, CALIFORNIA.

CONVERTIBLE SEAT FOR AUTOMOBILES.

1,095,660.
Specification of Letters Patent. Patented May 5, 1914.
Application filed June 16, 1913. Serial No. 774,021.

*To all whom it may concern:*

Be it known that I, ROBERT E. L. MORTON, a citizen of the United States, residing at Dinuba, in the county of Tulare and State of California, have invented certain new and useful Improvements in Convertible Seats for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in convertible seats for automobiles and other passenger carrying conveyances and it has for its object the provision of means whereby the seats of a vehicle may be quickly and readily converted into a bed or couch.

The invention has for its specific object the provision of means whereby an automobile or other passenger-carrying conveyance may be adapted for use both as a conveyance and means for providing adequate and comfortable sleeping accommodations, the seats being adapted to be automatically converted into a bed or couch without the necessity of removing the same from the vehicle or substituting parts therefor and as readily restored to their normal positions, thus providing a convenient vehicle for use in long distance touring and permitting the tourist to camp by night in localities in which sleeping accommodations could not otherwise be found.

The invention has for a further object the provision of means whereby the entire inside area of an automobile or other vehicle may be readily converted into a single or double sleeping couch or bed with provision whereby the couch or bed may be rigidly held or locked in the adjusted position and which may be quickly and automatically unlocked and restored to normal position.

To these ends and to such others as the invention may pertain, the same consists in the novel combination, arrangement and adaptation of parts, whereby the entire seating capacity of a vehicle may be quickly changed into a sleeping compartment of suitable capacity for use of touring or camping parties or, if desired, to change one section or half of the seating capacity into a couch or bed, suitable for use of physicians in emergency cases in which it is found necessary to provide a speedy conveyance of a patient.

The invention is clearly illustrated in the accompanying drawings which, with the numerals of reference marked thereon, form a part of this specification, and in which:—

Figure 1 is a longitudinal sectional view of the seating compartment of an automobile, illustrating my invention, the parts being shown in normal or seating position. Fig. 2 is a similar view, the seats being thrown into position for sleeping or emergency in case of sickness. Fig. 3 is a vertical sectional view taken on line 3—3 of Fig. 1. Fig. 4 is a longitudinal sectional view of a 5 or 7 passenger automobile wherein the back of the rear seat is utilized to fill the increased space between the rear seat and the back of the front seat when said back is in lowered position, thus affording a large area for sleeping purposes, and Figs. 5 and 6 are detail views of the locking bolts.

Reference now being had to the details of the drawings by numeral, 1 represents the body of an automobile of the usual construction, having a front seat 2 and a rear seat 9, the front seat 2 being provided with a suitable back which is divided into two parts 2$^a$ and 2$^b$, which are hingedly connected to the seat 2 by outer hinge members 2$^c$ and inner hinge members 2$^d$, which are pivotally connected to corresponding hinge members 2$^e$ and 2$^f$, secured to the seat 2. The inner hinge members 2$^d$ have downwardly projecting arms or levers 2$^n$ the object of which will be described later.

To the under forward edge of the front seat 2 are secured guide brackets 3 which are provided with longitudinal slots 3$^a$ having locking sockets 3$^b$ at their outer ends, said slots 3$^a$ being adapted to receive and guide lugs 4 which are secured to and carried by the pivoted extension seats 4$'$ and 4$^a$. Said seats are normally located under the seat 2 and out of the way of the feet of the operator of the automobile. The seats 4$'$ and 4$^a$ are provided on their under or rear sides with bracket 4$^b$ adapted to be pivotally connected with the forward ends of connecting rods 4$^c$ whose rear ends are connected to the downwardly extending levers 2$^n$ of the hinge members 2$^d$. It will be seen that, when the seat backs $2^a$ and $2^b$ are lowered into alinement with the front and rear seats, the extension seats $4'$ and $4^a$ will, through the medium of the levers $2^n$, rods $4^c$ and guide braces 3 be brought into alinement with the rear seat 9, backs $2^a$, $2^b$ and front seat 2.

Locking bolts X, one of which is shown in detail Fig. 5 of the drawings, are mounted to have longitudinal movements in grooves $X'$ formed in the lower portions of the extension seats $4'$ and $4^a$, and seated in an enlarged portion $X^2$ of the groove is a spring $X^3$, one end bearing against the shoulders at the end of said groove and the other end against a knob $X^4$ swiveled to the bolt X. Said knob, when in its retracted position, is adapted to be thrown laterally into an offset or slot $X^5$ in the edge of the groove, holding the spring under tension, but, when a partial revolution is imparted to the bolt to release the knob from said notch, the spring will tend to throw the bolt forward to project through the end of the groove and engage one end of a groove $X^6$ formed in the lower portion of the front seat and extending the entire width thereof. A longitudinally movable push bar, designated by $X^7$ and shown in Fig. 2 of the drawings, is mounted to have a longitudinal movement in said groove $X^6$ and, when the seats and backs are arranged in horizontal alinement as shown in Fig. 2 and the projecting end of the bolt X is pushed by the spring $X^3$ into the end of the groove $X^6$ and against the end of the push bar $X^7$, the latter is given a longitudinal movement to cause its other end to project beyond the rear edge of the seat 2 and engage the end of a groove $X^8$ formed in the back $2^a$. Said groove $X^8$ has a locking bolt Y, a detail of which is shown in Fig. 6 of the drawings, mounted to have a longitudinal movement therein and the groove $X^8$ is chambered as at $X^9$ to receive the coiled spring $Y'$, one end of which bears against the pin $Y^2$ and its other end against the shoulder $Y^3$ of the chambered portion of the groove, as shown in dotted lines in Fig. 3. When the projecting end of the push bolt comes in contact with and imparts a longitudinal movement to the bolt Y, one end of the latter will project through the groove at the rear edge of the prostrate back $2^a$ and will engage a hole $X^{10}$ formed horizontally in the forward edge of the rear seat, thus locking the seats and the backs in horizontal alinement to form a couch.

It will be noted that, when the bolts and push bar are in locking relation, the spring $Y'$ will be under tension and, when it is desired to release the bolts from their locking relation with the seats, the operator by taking hold of the knob $X^4$ and pushing the bolt X forward toward the front end of the vehicle, will cause the spring $X^3$ to be put under tension and allow the spring $Y'$ to expand, returning the bolt Y to its normal position and which latter bolt will impart a longitudinal movement to the push bar returning it to its normal position out of engagement with the hole $X^{10}$, while the bolt X will disengage from the groove in the bottom of the seat 2. The swinging of the knob $X^4$ into the offset $X^5$ will tend to hold the bolt X under tension of the spring $X^3$ in readiness to be thrown forward again when the knob $X^4$ is released from its notch.

It will be understood that each of the forward seats, which are fixed, as well as the backs thereto, and the rear seats which are movable are provided with similarly equipped bolt and push bar apparatus for locking the back and seat. In order to hold the backs in vertical upright positions, latches, designated by letter Z, are formed in the outer edge of each back and which are adapted to engage holes $Z'$, shown in dotted lines in Fig. 3 of the drawings.

It will be noted that, when the seats are properly disposed, a continuous bed extending throughout practically the entire length of the interior of the vehicle body will be provided. It will also be noted that the parts when thus adjusted in their relative positions will be securely held in place against the possibility of accidental displacement and it will be further noted that the seats may be quickly and readily restored to their normal positions when desired, the connections and lever mechanism provided for operating or changing the positions of the seat backs being such as to cause the connecting parts to be automatically adjusted by the movement of the seat back from its vertical to a horizontal position.

Having thus described my invention, what I claim to be new and desire to secure by Letters Patent is:—

1. In combination with a fixed forward seat and movable rear seats of a vehicle body, a hinged back to the forward fixed seat, an arm movable with the back, a folding seat having sliding pivotal connection with the fixed seat, pivotal rod connections between the folding seat and said arm, a pivotal leg to said folding seat, said seats and the backs having grooves formed therein, a spring-pressed bolt mounted within the groove in said folding seat, a longitudinally movable push bar mounted in the groove in the fixed seat, a spring-actuated bolt in the groove in said swinging back, said bolt in the folding seat adapted, when the seats and backs are swung in horizontal alinement, to be moved forward by action of the spring bearing against the same and engage the groove in the fixed seat and impart a longitudinal movement to the push bar, causing the latter to enter the groove in said back and move the push bolt therein under tension of the spring into a groove formed in the rear seat, as set forth.

2. In combination with a fixed forward seat and movable rear seats of a vehicle body, a hinged back to the forward fixed seat, an arm movable with the back, slotted bracket members fastened to the fixed seat, a folding seat having pivotal pins projecting therefrom and adapted to have sliding movements in the slotted brackets, pivotal supporting legs to said folding seat, a rod pivotally connecting said arm with the folding seat, said seats and backs having grooves formed therein, a spring-actuated bolt in the groove in said swinging back, said bolt in the folding seat adapted, when the seats and backs are swung in horizontal alinement, to be moved forward by action of the spring bearing against the same and engage the groove in the fixed seat and impart a longitudinal movement to the push bar, causing the latter to enter the groove in said back and move the push bolt therein under tension of the spring into a groove formed in the rear seat, as set forth.

In testimony whereof I hereunto affix my signature in presence of two witnesses.

ROBERT E. L. MORTON.

Witnesses:
  ELSIE LADD,
  FRANKLIN H. HOUGH.